Dec. 24, 1957     C. R. TURNER     2,817,741
CONTROL APPARATUS FOR SURFACE COOKING UNITS
Filed May 28, 1953
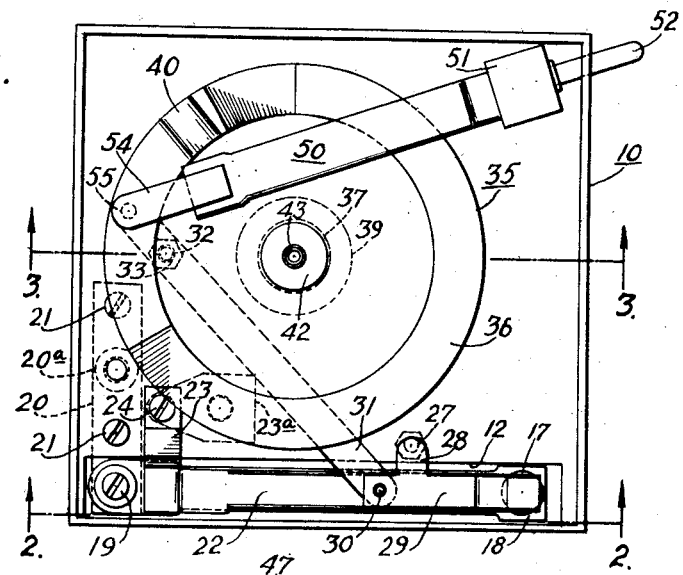
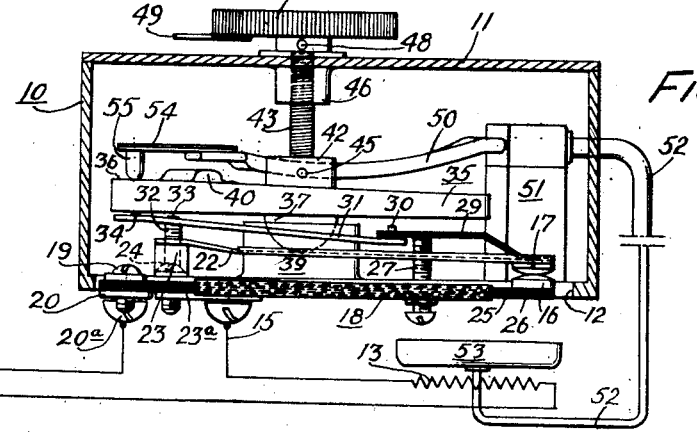
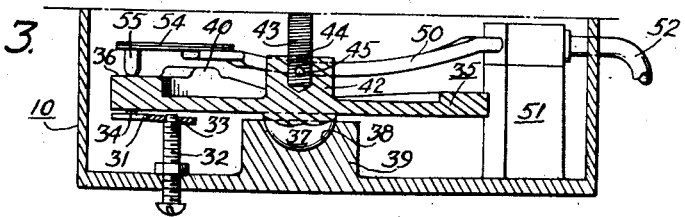
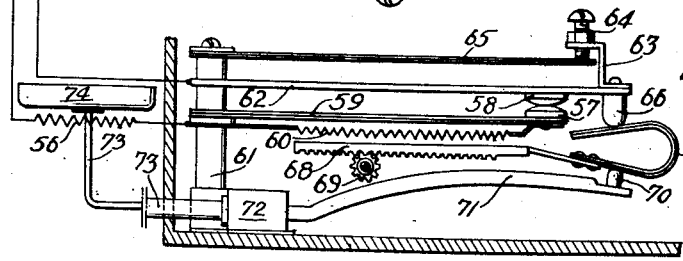
Inventor:
Charles Roger Turner
by his Attorneys
Howson &
Howson

United States Patent Office 2,817,741
Patented Dec. 24, 1957

2,817,741

CONTROL APPARATUS FOR SURFACE COOKING UNITS

Charles Roger Turner, Enfield, Pa., assignor to Proctor Electric Company, Philadelphia, Pa., a corporation of Pennsylvania Application May 28, 1953, Serial No. 358,071

15 Claims. (Cl. 219—20)

This invention relates to control of surface cooking units such as those commonly employed in electric ranges. More particularly, the invention relates to control of a surface cooking unit according to the temperature of a cooking vessel placed on the unit.

The use of the vessel temperature as the medium of control of such a cooking unit is highly desirable, inasmuch as it is the vessel and its contents that is being heated by the cooking unit. It is also desirable to provide for rapid initial heating of the cooking vessel and its contents.

The principal object of this invention is to provide a simple and efficient apparatus embodying these desirable features as well as other features which will be apparent from the following description.

By this invention there is provided an apparatus for controlling the operation of an electric surface cooking unit having a predetermined continuous wattage input capacity, comprising means for supplying to the cooking unit a wattage input greater than its said capacity to effect initial rapid heating of the unit, means for effecting intermittent energization of said unit to supply a lower average wattage input thereto, means cooperable with said last means to limit the maximum average input to said unit substantially to the said capacity of said unit, and means responsive to the temperature of a vessel placed on said unit for varying the intermittent energization of said unit so as to reduce the average wattage input to said unit as the vessel temperature rises.

The invention may be clearly understood by reference to the accompanying drawing illustrating certain embodiments, wherein Fig. 1 is a plan view of a device embodying the invention, with the cover removed to expose the component parts;

Fig. 2 is a sectional view taken along line 2—2 of Fig. 1, together with a diagrammatic illustration of the associated cooking unit and energizing circuit;

Fig. 3 is a sectional view taken along line 3—3 of Fig. 1; and

Fig. 4 is a partial sectional and diagrammatic illustration of another embodiment.

Referring first to Figs. 1 to 3, the device illustrated comprises a casing 10 having a cover 11 which is removed in Fig. 1 and also having a bottom opening 12 to accommodate elements hereinafter described. The device serves to control an electric surface cooking unit 13, shown in Fig. 2, which is energized from supply conductors 14. The cooking unit 13 has a predetermined continuous wattage input capacity, e. g. 1250 watts, and in order to effect rapid initial heating of a cooking vessel placed on the cooking unit the voltage of the supply line 14 is such in relation to the resistance of the cooking unit so as to effect substantial overenergization of the cooking unit. By way of example, if the cooking unit has a normal continuous input capacity of 1250 watts, the overenergization may be twice that value or 2500 watts. Of course, the cooking unit could not stand this rate of energization continuously, but it can do so for short intervals if the average wattage input is reduced by intermittent energization substantially to the normal capacity of the unit. The apparatus provided by this invention effects intermittent energization of the cooking unit, after an initial period of overenergization, to provide an average wattage input lower than the overenergization rate and, further, the control apparatus limits the maximum average input substantially to the normal capacity of the unit. Further, the apparatus provides for control of the intermittent energization of the unit according to the temperature of a cooking vessel placed on the unit.

The energizing circuit 15 for the cooking unit 13 includes a control switch having a pair of contacts 16 and 17 which are opened and closed to effect the intermittent energization of the cooking unit. Contact 16 is carried at the free end of a composite thermomotive member 18 whose opposite end is secured by screw 19 to a rigid supporting strip 20 which underlies the bottom of casing 10 and is secured thereto by screws 21. Strip 20 has a terminal screw 20a for connection to the energizing circuit. The other switch contact 17 is carried at the free end of an arm 22 which is rigid by virtue of its being of channel cross-section but which is integral with a spring mounting element 23 secured to the bottom of casing 10 by screw 24. The spring action of element 23 urges contact 17 downward. A terminal lug 23a underlies the bottom of the casing and is connected to element 23 by the screw 24.

The elements thus far described constitute an arrangement for effecting cyclic intermittent energization of the electric cooking unit. The switch contacts 16 and 17 and the composite thermomotive member 18 comprise a current-actuated cyclically-operable thermostatic wattage controller for the cooking unit in circuit therewith. This wattage controller is of the character disclosed in U. S. Patent No. 2,623,137, issued December 23, 1952, to W. H. Vogelsberg. The composite thermomotive member 18 comprises a bimetallic element 25 and an associated heater element 26 which is included in the energizing circuit so as to be supplied with current when the contacts 16 and 17 are closed. The bimetal element 25 receives heat from the energized heater element and flexes downward to effect opening of the switch contacts, whereupon cooling of the bimetal element causes subsequent closure of the contacts. The heater element 26 serves additionally to augment the switching action in such a way as to give sharp makes and breaks. As described in the above-mentioned Vogelsberg patent, the heater element 26 is thermomotive to a lesser degree than the controlling bimetal element 25, and the thermomotive actions of the two elements are opposite to one another. The opposing thermomotive action of the heater element enhances the switch operation from the standpoint of sharp or clean makes and breaks. For a full description of this type of wattage controller, reference may be had to the above-mentioned Vogelsberg patent.

In order to limit the maximum average wattage input to the cooking unit 13 to a predetermined value, an adjustable stop or limit screw 27 is provided on the bottom of the casing 10 so as to extend upwardly therefrom and is engageable by a lateral extension 28 of an arm 29 secured to the contact end of arm 22. The screw 27 limits the downward positioning of contact 17 to serve the purpose above-mentioned, the full significance of which will be apparent later.

The arm 29 not only cooperates with the stop screw 27 for the above-mentioned purpose, but it also serves as a means to compensate for effects of ambient temperature and as a means through which the positioning of contact 17 is controlled by elements presently to be described. For performance of its ambient temperature compensating function, the arm 29 is a bimetallic element which, in response to increase of ambient temperature, tends to straighten and move contact 17 downward to compensate for the effects of ambient temperature upon the controlling bimetal element 25.

The left-hand end of arm 29 is apertured to receive an upwardly extending pin 30 on one end of a lever 31. This lever is fulcrumed near its opposite end on an adjustable fulcrum screw 32 which has a reduced end 33 extending upward through an aperture in the lever 31. The screw 32 is carried by the bottom of casing 10 and extends upward therefrom. The actuating end portion of lever 31 is provided with a small button 34 which engages the bottom of a rotatable circular cam 35 having an upper peripheral cam race 36. The cam 35 is arranged for both rotary motion and tilting motion for a purpose which will appear presently. As may be seen in Fig. 3, the cam has a central downwardly projecting semi-spherical portion 37 which seats in a complementary semi-spherical recess 38 in an upwardly projecting support 39 integral with the bottom of casing 10. The cam also has an upper projection 40 through which the device is turned off as hereinafter described. The cam is also provided with a central upwardly extending portion 42 by which it is connected to the lower end of flexible shaft 43. The lower end of the shaft extends into a recess 44 of portion 42 and is secured thereto by a pin 45. The upper portion of flexible shaft 43 extends through a bushing 46 carried by a cover 11 and is secured to a knob 47 by means of pin 48. Rotation of the knob 47 effects rotation of the cam 35, and the position of adjustment in any instance is indicated by pointer 49 carried by knob 47 in relation to suitable markings or indicia (not visible) on the upper surface of cover 11.

Above the cam 35 there is a Bourdon tube 50 supported at one end by a pedestal support 51 extending upward from the bottom of casing 10. The Bourdon tube is actuated through tube 52 from a vessel temperature responsive member or bulb 53 which is arranged to be engaged by a cooking vessel placed on the cooking unit 13. The diagrammatic illustration of the vessel temperature responsive arrangement is sufficient in view of the fact that such arrangement is well known.

At its free end the Bourdon tube 50 carries an arm 54 which is provided with a downwardly projecting finger 55 for engagement with the cam race 36 of cam 35. In addition to serving as an actuating arm the arm 54 serves to compensate for the effects of ambient temperature upon the action of the vessel temperature-responsive means. For this purpose, the arm 54 is a bimetal arm with its high expansion side downward. Since the effect of increase of ambient temperature on the Bourdon tube 50 will be to cause the free end of the tube to move downward, it is desired that the free end of arm 54 shall move upward to compensate for such effect.

Considering the operation of the apparatus, it should be noted that the peripheral portion of the cam 35 is actually a tapering circular wedge which is interposed between the actuating end of lever 31 and the actuating arm 54 carried by the free end of the Bourdon tube 50. Adjustment of the cam by means of knob 47 determines the amount of actuation of contact 17 by Bourdon tube 50 and thus determines the temperature level at which the cooking vessel will be maintained. The lowest point on the cam race gives the highest temperature level, while the highest point on the cam race gives the lowest temperature level. The swivel or universal mounting of the cam effectively provides a floating wedge for the above-stated purpose.

Considering the operation, when the projection 40 is in engagement with finger 55, lever 31 is actuated sufficiently to open the contacts and hold them open. The device is then in the "off" condition. If desired, an on-off switch can be placed on the opposite side of the heating unit 13 to provide for opening of both sides of the supply line. Assume now that a vessel containing food to be cooked has been placed on the cooking unit 13, and that the control knob 47 has been adjusted to the on position for operation at the lowest temperature level, as shown. In this condition of the device, the Bourdon tube 50 and arm 54 may be stressed upward. Initially, the contacts 16 and 17 are closed and the cooking unit 13 is overenergized, as previously mentioned. This causes rapid initial heating of the cooking vessel for a short interval, e. g. an interval of one minute. If the quantity of food in the vessel is quite large, this interval will not be sufficient to raise the temperature of the cooking vessel to the desired operating temperature, but it will be sufficient to effect substantial heating of the vessel. As the controlling bimetal element 25 is heated, it flexes downward and moves contact 16 downward. Contact 17 tends to move downward under the influence of the self-bias of spring arm 22, but the downward movement of contact 17 is limited by the stop screw 27 when it reaches the position illustrated in Fig. 2. With the contact 17 stopped by the stop screw, the contacts will be opened and closed by the cyclic thermostatic action to provide an average wattage input to the cooking unit of approximately the normal capacity of the cooking unit.

As the temperature of the cooking vessel rises, the Bourdon tube 50 is actuated and tends to straighten itself, with consequent downward movement of arm 54 and tilting of the adjacent cam portion, and with consequent downward movement of the actuating end of lever 31. This causes upward movement of the other end of said lever, thus moving contact 17 upwardly. As this contact moves upwardly, the energization time of the cooking unit is decreased and the deenergization time is increased and, therefore, the average wattage input is decreased until finally contact 17 is raised sufficiently so that the average wattage input is just sufficient to maintain the temperature level for which the knob 47 has been set. If the vessel should get too hot, for example if it boiled dry, the contacts would be held open.

When the device is adjusted for operation at high temperature level, at the start of operation the finger 55 will barely engage the cam race or will be only slightly out of engagement therewith, and hence the parts which are freely mounted cannot become detached.

It will be seen from the above description that lever 31 provides substantial mechanical amplification by reason of the location of its fulcrum. Thus, very little movement of the actuating end of the lever is required to produce effective movement of contact 17. However, the free end of the Bourdon tube 50 and the arm 54 more through a substantial range in order to provide control throughout the adjustment range of the device, and this movement is of the order of five or six times the movement of the free end of the bimetal element 25.

The specific mounting of the cam and the flexible shaft drive constitute a convenient arrangement for the purpose of the invention, but such arrangement is only exemplary and any other suitable arrangement may be employed.

It will be seen from the foregoing description that the stop screw 27 prevents prolonged continuous overenergization of the cooking unit, and this feature is important for two principal reasons. Where a substantial quantity of food is being cooked, the initial period of overenergization would be excessive if it were not for the presence of the limiting stop screw 27. Furthermore, if the apparatus were operated initially without any cooking vessel on the cooking unit, the cooking unit would be overenergized for such a long interval that it probably would be injured or destroyed. It will be realized, therefore, that the limiting stop screw represents a very important feature.

A further feature of the apparatus is the utilization in such apparatus of a thermostatic wattage input controller which is adapted to effect rapid or clean makes and breaks of the switch contacts.

Still another feature of the apparatus is the provision for separate or individual ambient temperature compensation for the thermostatic wattage input controller and the vessel temperature-responsive means. This enables substantially complete nullification of any effects of ambient temperature changes.

In Fig. 4 there is shown a different form of the apparatus embodying the invention. In this instance the cooking unit 56 is controlled through the operation of contacts 57 and 58 as in the first embodiment. Contact 57 is actuated by the controlling bimetal element 59 which is activated by heater 60, these elements being mounted on support 61. Contact 58 is carried by a downwardly biased spring arm 62 also mounted on the support 61. Arm 62 carries a bracket 63 which in turn carries the limiting stop screw 64 that engages the free end of a bimetal arm 65 also mounted on support 61. Arm 62 also has a downwardly projecting button 66 which engages a U-shaped bimetallic wedge 67. The latter is connected to a rack 68 which is movable by a pinion 69 connected to an operating knob (not shown). In practice, some means such as leaf spring would be provided to hold the rack in mesh with the pinion. The wedge 67 is also engaged by a button 70 on the free end of Bourdon tube 71 mounted at 72 and operable through tube 73 from a vessel temperature-responsive element 74.

In operation of this embodiment the screw 64, by its engagement with bimetal arm 65, limits downward movement of contact 58 and thus limits the maximum average wattage input to the cooking unit 56. The bimetal arm 65 also compensates for ambient temperature effects upon the thermostatic switch action in operation at maximum wattage input, having its high expansion side disposed upwardly. Adjustment of the wedge 67 determines the amount of actuation of contact 58 by the Bourdon tube 71, and the bimetallic wedge compensates for effects of ambient temperature at less than the maximum wattage input. The wedge 67 is free to move with respect to pinion 69 as an axis and, therefore, the wedge is enabled to move upward to actuate the contact 58. The free end of the Bourdon tube will move upward in response to ambient temperature and, therefore, the high expansion side of the bimetallic wedge is disposed outwardly so that the arms of the wedge will move closer to compensate for the upward movement of the Bourdon tube.

The operation of this embodiment is the same as in the first embodiment, the wedge 67 serving the same purpose as the peripheral wedge portion of the cam in the first embodiment. However, it should be noted that the U-shaped bimetal wedge 67 gives ambient compensation action which varies with the particular setting of the control knob. Thus, for low temperature settings the wider portion of the U-shaped wedge will be effective and the compensating action will be quite small. For higher temperature settings, however, the narrower portion of the wedge will be effective, and a larger compensating effect will be had. This is advantageous because there is need for greater compensation at the higher temperature settings due to the fact that more fluid is forced into the Bourdon tube at higher temperature levels than at lower temperature levels. Hence, the Bourdon tube is more responsive to ambient temperature at the higher levels and, consequently, there is need for greater compensation.

While certain embodiments of the invention have been illustrated and described, the invention is not limited thereto, but contemplates such modifications and further embodiments as may occur to those skilled in the art.

I claim:

1. In an apparatus for controlling the operation of an electric surface cooking unit having a predetermined continuous wattage input capacity, means for initially supplying to said unit a continuous wattage input greater than its said capacity to effect initial rapid heating of the unit, means for subsequently interrupting said continuous wattage input and thereafter effecting intermittent energization of said unit to supply thereto a lower average wattage input than said initially-supplied input, means cooperable with said last means to limit the maximum average input to said unit substantially to the said capacity of said unit, and means responsive to the temperature of a vessel placed on said unit for varying the intermittent energization of said unit so as to reduce the average wattage input to said unit as the vessel temperature rises.

2. In an apparatus for controlling the operation of an electric surface cooking unit having a predetermined continuous wattage input capacity, an energizing circuit for said unit to supply thereto an initial wattage input greater than the said capacity of the unit to effect initial rapid heating of the unit, a controlling switch in said circuit having a pair of contacts, current-operable thermostatic means connected in said circuit and arranged to effect movement of one of said contacts to open and close said switch recurrently, whereby to effect intermittent energization of said unit to supply thereto a lower average wattage input than said initially-supplied input, means associated with said switch to limit the closure time of the switch to a predetermined maximum so as to limit the maximum average input to said unit substantially to the said capacity of said unit, and means responsive to the temperature of a vessel placed on said unit for effecting movement of the other switch contact in a direction to reduce the average wattage input to said unit as the vessel temperature rises.

3. In an apparatus for controlling the operation of an electric surface cooking unit having a predetermined continuous wattage input capacity, an energizing circuit for said unit to supply thereto an initial wattage input greater than the said capacity of the unit to effect initial rapid heating of the unit, a controlling switch in said circuit having a pair of contacts, current-operable thermostatic means connected in said circuit and arranged to effect movement of one of said contacts to open and close said switch recurrently, whereby to effect intermittent energization of said unit to supply thereto a lower average wattage input than said initially-supplied input, means associated with said switch to limit the closure time of the switch to a predetermined maximum so as to limit the maximum average input to said unit substantially to the said capacity of said unit, means responsive to the temperature of a vessel placed on said unit for effecting movement of the other switch contact in a direction to reduce the average wattage input to said unit as the vessel temperature rises, and manually-adjustable means for varying the action of the last-recited means so as to establish an ultimate average wattage input to said unit such as to maintain a selected temperature level of the cooking vessel.

4. In an apparatus for controlling the operation of an electric surface cooking unit having a predetermined continuous wattage input capacity, an energizing circuit for said unit to supply thereto an initial wattage input greater than the said capacity of the unit to effect initial rapid heating of the unit, a controlling switch in said circuit having a first contact and a second contact biased toward the first contact, current-operable thermostatic means connected in said circuit and arranged to effect movement of said first contact to open and close said switch recurrently, whereby to effect intermittent energization of said unit to supply thereto a lower average wattage input than said initially-supplied input, means including a stop element for limiting motion of said second contact in the direction of said first contact, thereby to limit the closure time of the switch to a predetermined maximum so as to limit the maximum average input to said unit substantially to the said capacity of said unit, and means responsive to the temperature of a vessel placed on said unit for effecting movement of said second contact away from said first contact so as to reduce the average wattage input to said unit as the vessel temperature rises.

5. In an apparatus for controlling the operation of an electric surface cooking unit having a predetermined continuous wattage input capacity, an energizing circuit for said unit to supply thereto an initial wattage input greater than the said capacity of the unit to effect initial rapid heating of the unit, a controlling switch in said circuit having a pair of contacts, current-operable thermostatic means connected in said circuit and arranged to effect movement of one of said contacts to open and close said switch recurrently, whereby to effect intermittent energization of said unit to supply thereto a lower average wattage input than said initially-supplied input, means associated with said switch to limit the closure time of the switch to a predetermined maximum so as to limit the maximum average input to said unit substantially to the said capacity of said unit, an element movable in response to the temperature of a vessel placed on said unit, an element connected to the other switch contact to actuate the same, and a manually-adjustable member of varying dimension interposed between said elements and engageable therewith, the movement of said first element in response to the vessel temperature effecting movement of said second element through said member to an extent dependent upon the adjustment of said member and in a direction to reduce the average wattage input to said unit, whereby to establish an ultimate wattage input to said unit such as to maintain a selected temperature level of the cooking vessel according to the adjustment of said member.

6. Apparatus according to claim 5, wherein said adjustable member is in the form of a rotatable swivelly-mounted circular cam having a portion of varying thickness between said elements.

7. Apparatus according to claim 6, including a bimetal arm carried by a Bourdon tube for movement in response to vessel temperature and serving to compensate for ambient temperature effects upon the Bourdon tube, and a bimetal arm on said switch for actuation thereof by the Bourdon tube through the cam, the latter arm compensating for ambient temperature effects upon the switch-actuating thermostatic means.

8. Apparatus according to claim 7, including a lever for actuating the last-mentioned arm from the cam.

9. Apparatus according to claim 5, wherein said adjustable member is in the form of a U-shaped member having converging arms respectively engageable by said elements.

10. Apparatus according to claim 9, wherein said U-shaped member is bimetallic to compensate for effects of ambient temperature upon the action of said first element.

11. Apparatus according to claim 10, including a bimetal element arranged to compensate for ambient temperature effects upon the switch-actuating thermostatic means.

12. In an apparatus for controlling the operation of an electric surface cooking unit, a controlling switch comprising a pair of contacts, current-operable thermostatic means arranged to actuate one of said contacts, an energizing circuit for said cooking unit including only said contacts and said thermostatic means in series with one another and with said unit, whereby said thermostatic means effects recurrent movement of said one contact out of and into engagement with the other contact to cause intermittent energization of said cooking unit and consequent supply of an average wattage input thereto, a temperature-responsive member arranged to be engaged by a cooking vessel placed on said cooking unit so as to respond to the temperature of the cooking vessel, and means operable by the temperature response of said member to vary the position of said other contact in a direction to decrease the ratio of closure time to open time of said switch when the temperature of the cooking vessel increases and to increase the ratio of closure time to open time of said switch when the temperature of the cooking vessel decreases, thereby to vary the average wattage input to said cooking unit in inverse relation to temperature variations of the cooking vessel.

13. In an apparatus for controlling the operation of an electric cooking unit, the combination comprising a thermostatically operable intermittent cycling switch thermally disassociated from said unit but interconnected in an electric circuit for energizing the same, said switch including means for actuating its contacts to energize said circuit continuously for a period established by said actuation, electric resistance means for heating said switch to terminate said continuous energization and establish its cyclic operation, means for adjusting the operative effect of said electric resistance means and thereby varying the ratio of the time during which the switch contacts are in engagement to the time during which they are in disengagement, a thermostatic element in thermally conductive relation to heat derived from said unit for sensing the temperature thereof, and means responsive to the temperature sensed by said last-named means for decreasing the ratio of the time during which the contacts of said thermostatically operable cycling switch are in engagement to the time during which they are in disengagement as set by said adjusting means as said sensing means senses a higher vessel temperature.

14. In an apparatus for controlling the operation of an electric heating unit, the combination comprising a controlling switch including a pair of contacts in circuit with said heating unit, thermostatic means mechanically interconnected with one of said contacts and heated and cooled in response to intermittent flow of current in said circuit to cause said contact to move into and away from engagement with the other contact recurrently to cause intermittent energization of said heating unit, and further thermostatic means controlled by the temperature derived from said unit to superimpose upon said first-mentioned movement a relative movement of said contacts away from each other as said derived temperature is increased, whereby the ratio of the time during which said contacts are engaged to the time during which they are disengaged is decreased as said derived temperature is increased.

15. An apparatus as defined in claim 14, including, in addition to said plural thermostatic means for recurrently moving said one contact into engagement with the other and for superimposing a further movement of said contacts relative to each other, means for manually adjusting the relative positions of said contacts to thereby modify further the ratio of the time during which said contacts are engaged to the time during which they are disengaged.

References Cited in the file of this patent

UNITED STATES PATENTS

| | | |
|---|---|---|
| 2,197,230 | Waddell | Apr. 16, 1940 |
| 2,210,947 | Myers et al. | Aug. 13, 1940 |
| 2,224,983 | Parkhurst | Dec. 17, 1940 |
| 2,363,326 | Hodgkins | Nov. 21, 1944 |
| 2,388,702 | Pearce | Nov. 13, 1945 |
| 2,399,423 | Bletz | Apr. 30, 1946 |
| 2,403,824 | Newell | July 9, 1946 |
| 2,422,526 | Burch | June 17, 1947 |
| 2,623,137 | Vogelsberg | Dec. 23, 1952 |